United States Patent [19]

Taillefert et al.

[11] Patent Number: 4,810,452
[45] Date of Patent: Mar. 7, 1989

[54] METHOD OF MAKING A FACING PANEL

[75] Inventors: Raymond Taillefert, Villeneuve la Garenne; Jean-Claude Philibert, Ermont, both of France

[73] Assignees: Automobiles Peugeot, France; Automobiles Citroen, France

[21] Appl. No.: 105,606

[22] Filed: Oct. 6, 1987

[30] Foreign Application Priority Data

Oct. 16, 1986 [FR] France .................. 86 14391

[51] Int. Cl.⁴ .............................. B29C 39/10
[52] U.S. Cl. ........................ 264/247; 264/46.4; 264/257
[58] Field of Search ........... 264/331.19, 45.1, 46.4, 264/46.5, 246, 247, 277, 511, 261, 46.6, 257

[56] References Cited

U.S. PATENT DOCUMENTS

| 3,989,869 | 11/1976 | Neumaier | 264/331.19 |
| 4,307,058 | 12/1981 | Morello et al. | 264/510 |
| 4,501,790 | 2/1985 | Aizawa et al. | 428/283 |

FOREIGN PATENT DOCUMENTS

| 0023194 | 1/1981 | European Pat. Off. | 264/45.1 |
| 32914 | 3/1928 | France | 264/246 |
| 48019365 | 5/1970 | Japan | 264/46.4 |
| 59-187680 | 10/1984 | Japan | 264/257 |

Primary Examiner—Jan H. Silbaugh
Assistant Examiner—Allan R. Kuhns
Attorney, Agent, or Firm—Steinberg & Raskin

[57] ABSTRACT

A method of making a facing panel including on its visible side a portion of moquette, a portion of fabric, a portion consisting of a layer of compact polyurethane of a first color and a portion consisting of compact polyurethane of a second color, these portions being fastened to a wall or backing and the whole being made by positioning at first fragments of moquette and fabric on a die, then projecting layers of compact polyurethane and applying a lining backing.

4 Claims, 2 Drawing Sheets

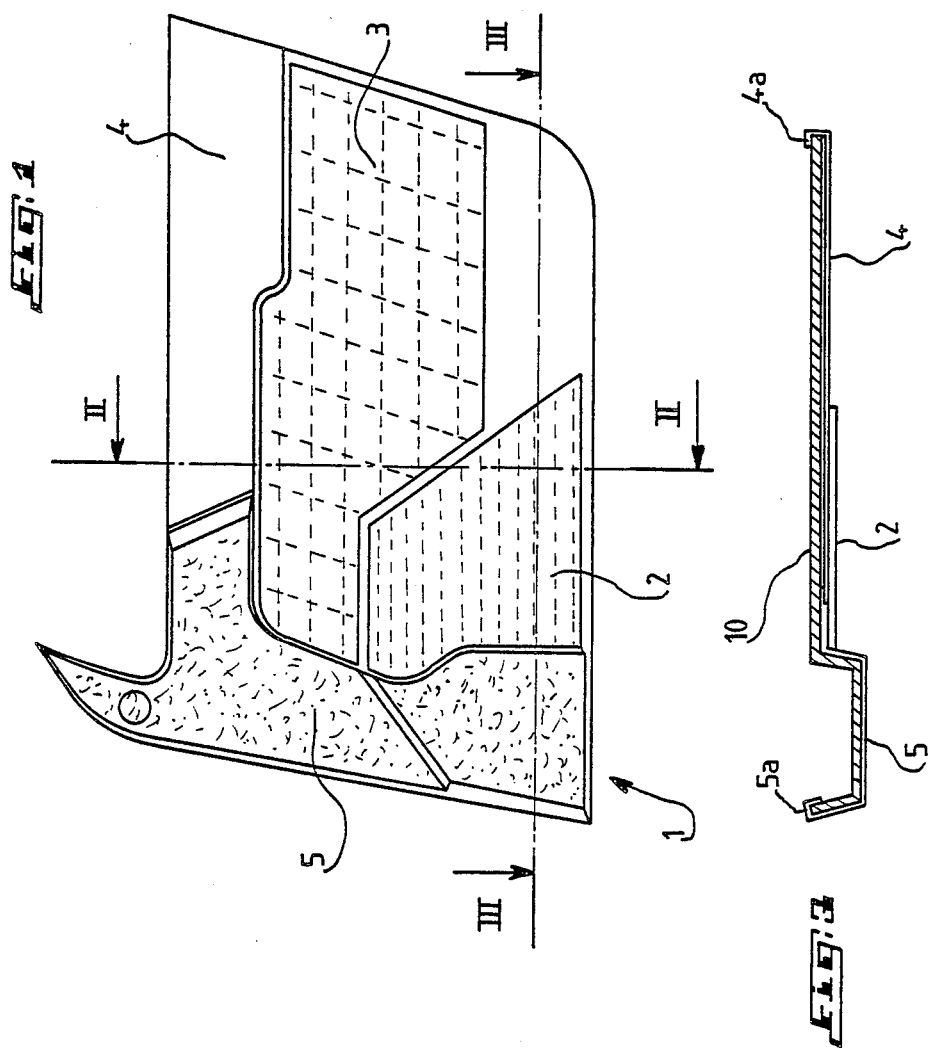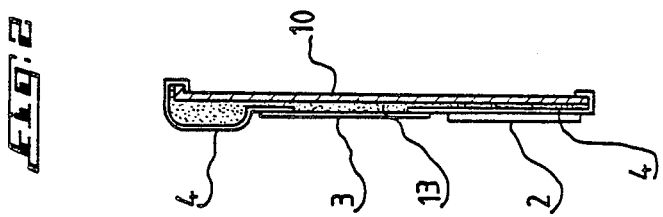

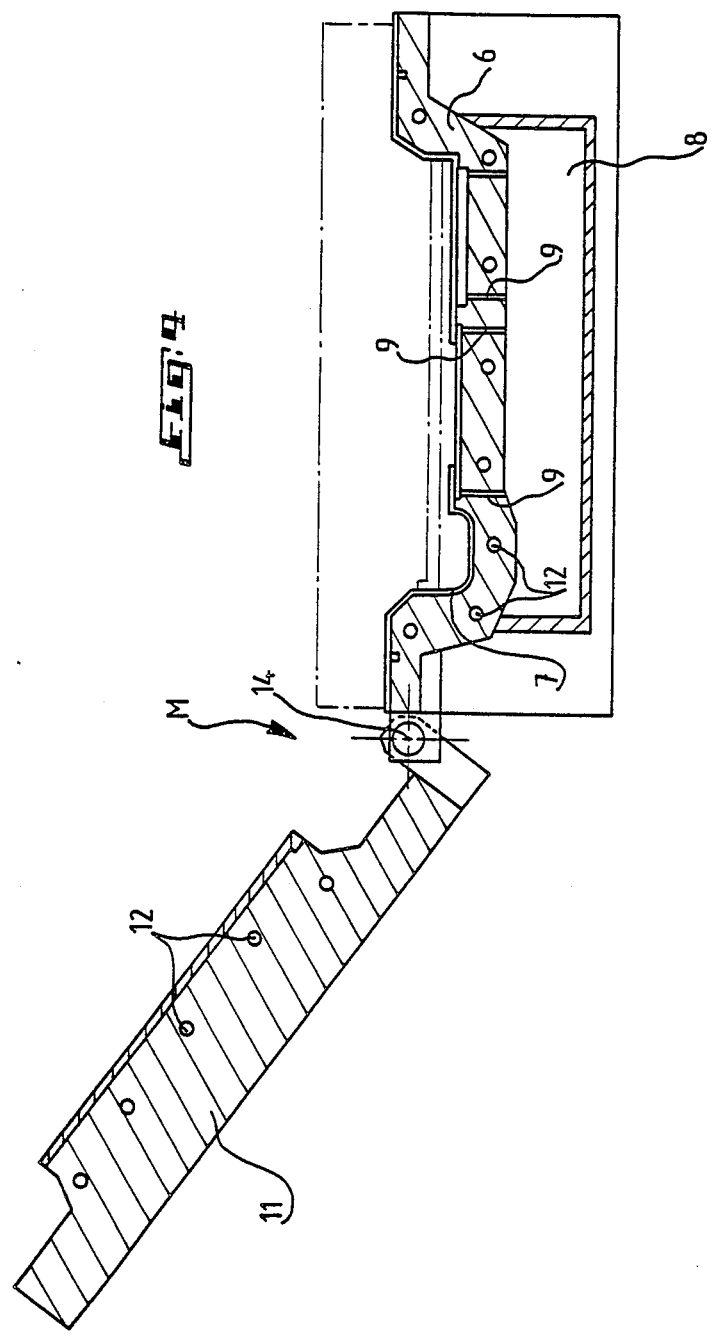

METHOD OF MAKING A FACING PANEL

BACKGROUND OF THE INVENTION

The present invention relates essentially to a method of manufacturing a facing panel such as for instance an inner lining panel for a door of an automotive vehicle.

The invention is also directed to a panel obtained through this method.

There is presently a trend to provide on the visible side of the vehicle door panels style effects by securing to that visible side fragments of materials of differing natures such as moquette or fabric and/or of various colors and/or various grains.

Until now, such style effects were obtained by fastening through adhesive bonding, gluing or sticking, fragments of moquette and/or fabric onto the panel which generally resulted from an assembly of several parts.

The various assembling and sticking operating steps however suffered from some complexity and, as is readily understandable, required a substantial time so that they were expensive.

SUMMARY OF THE INVENTION

The object of the present invention is to remove such drawbacks by providing in particular a method of making a facing or lining panel which remains particularly simple and economical.

For that purpose, the subject matter of the invention is a method of manufacturing a facing panel such for instance as the inner lining panel of the door of an automotive vehicle comprising surface portions consisting of fragments of ornamental material of various natures or colors such for instance as moquette and/or fabric, characterized in that each fragment is placed against the wall of a die onto which is sprayed at least one layer of compact polyurethane and then a facing-supporting or lining-backing wall is applied onto that layer.

According to another characterizing feature of this method and before or after applying the aforesaid wall or backing, a certain amount of liquid polyurethane is injected onto the layer of compact polyurethane.

It should further be specified here that the layer of compact polyurethane may be carried out according to successive projections by concealing or hiding one or several portions of the die and possibly of the fragments of ornamental material.

The invention is also directed to a panel obtained by the method according to either one of the foregoing characterizing features, this panel comprising one or several fragments of ornamental material such a moquette, fabric or the like fastened to a backing or like support and being characterized by one or several visible layers of compact polyurethane and completing the facing constituted by the aforesaid fragment or fragments.

A layer of polyurethane foam may be interposed between the layer of compact polyurethane and possibly the fragments of ornamental material and the aforesaid backing.

This foam between the backing and the layer of compact polyurethane or the fragments of fabric or moquette not only provides an efficient connection between the lining elements but also a feeling of comfort for the passenger who touches or hits the facing.

It should further be specified here than the panel according to this invention may comprise layers of compact polyurethane of differing appearances and of differing colors.

According to a particular embodiment, this panel may comprise at least one fragment of fabric and/or moquette and at least two layers of compact polyurethane differing by their colors or their outer appearances.

BRIEF DESCRIPTION OF THE DRAWINGS

The invention will be better understood and further objects, characterizing features, details and advantages thereof will appear as the following explanatory description proceeds with reference to the accompanying diagrammatic drawings given by way of non-limiting example only illustrating a presently preferred specific embodiment of the invention and wherein:

FIG. 1 is an elevational view of the visible side of a facing panel forming for instance a vehicle door and carried out according to the principles of the invention;

FIGS. 2 and 3 are views in sections taken upon the lines II—II and III—III, respectively, of FIG. 1; and FIG. 4 is a diagrammatic sectional view of a mould for making the panel.

DESCRIPTION OF THE PREFERRED EMBODIMENTS

According to an exemplary embodiment and with reference to FIG. 1, there is seen an inner panel 1 of a door of an automotive vehicle the inner and visible side of which comprises a portion 2 made from moquette, a portion 3 made from a fabric, a portion 4 consisting of a layer of compact polyurethane of a first color and a portion 5 consisting of a layer of compact polyurethane of a second color and the outer appearance or grain of which may differ from that of portion 4.

This panel is obtained, according to the invention, by the method which will now be described with reference in particular to FIG. 4.

There is used a mould M which comprises a die 6 the inner wall 7 of which reproduces the visible shape of the desired panel and which possibly comprises a stamp 11 pivotally connected at 14 to said die.

The latter is fitted with a vacuum chamber 8 connected to the wall 7 through channels or ducts 9.

Fragments of moquette and/or of fabric such as 2 and 3 are positioned onto the die 6 so that these fragments are firmly kept applied or pressed against the wall 7 by the vacuum.

Afterwards, a hiding cover is arranged onto the place of the layer of compact polyurethane of the second color 5 and possibly onto one of the fragments of ornamental material such for instance the fragment of fabric 3. This hiding cover may be made from a material known under the commercial name "Teflon", silicon or of aluminum coated with a stripping agent.

Then, by means of a spray gun is projected a layer of compact polyurethane forming the layer 4 having the first color and consisting of polyol and of isocyanate.

Then the hiding cover is removed so as to provide in the same way and through projection the layer 5 of compact polyurethane exhibiting the second color, which layer may overlap the periphery of the layer of the first color 4 and this without any inconvenience since it is located on the invisible or hidden side of the panel 1. It is therefore appreciated that the layer of compact polyurethane serves both an ornamental purpose and the purpose of connecting the moquette and the fabric.

Then a wall or backing 10 shown on FIGS. 2 and 3 is applied onto the die 6. This wall 10 may consist for instance of compressed wood fibers or of a plate of injected or hot-shaped thermoplastic material and the adhesive bonding of this wall 10 is made directly onto the layer of compact polyurethane 4, 5 freshly deposited. This is what is seen on FIG. 3. It should be pointed out here that the edge 4a or 5a of the layer 4 or 5 may be folded down onto the edge of the backing or wall 10 as seen on said Figure.

It is possible, although not at all compulsory, to inject, after applying of the layer 4, 5, a certain amount of liquid polyurethane whereafter the wall or backing 10 is applied by lowering the stamp 11.

After this stamp 11 has been applied onto the wall 10, the mould M is heated owing to a heating circuit diagrammatically shown at 12 on FIG. 4 and through which hot water or oil is flowing and this during the time required for the curing of the polyurethane which forms a foam 13 as seen on FIG. 2. On this Figure is well shown that the foam 13 forms a layer interposed between the backing 10 and the assembly consisting of the layer of compact polyurethane of a first color 4 which at least partially covers the fragment of moquette 2 and the fragment of fabric 3. Here again, as previously explained and as well seen on FIG. 2, the edge of the layer of compact polyurethane may be folded down onto the edge of the backing 10.

Of course, the liquid polyurethane forming the foam 13 may not be injected before applying of the backing 10 but after applying of this backing by means of the stamp 11 without leaving the scope of the invention.

There has therefore been provided, according to this invention, a lined panel made from one single piece comprising fragments of very various materials and this panel may be obtained very quickly for a very low cost price and may comprise ornamental patterns or designs in any number in order to provide any style effect.

Thus, the inner wall 7 of the die 6 may either be smooth or comprise any grain selected in accordance with the desired effect to be obtained.

The invention is of course not at all limited to the embodiment described and shown which has been given by way of example only.

Thus, the materials forming the visible side of the panel may be of any nature, number and color.

The invention therefore comprises all the technical equivalents of the means described as well as their combinations if same are carried out according to its gist.

What is claimed is:

1. A method of making a facing panel, such as for instance an inner panel of a door of an automotive vehicle, comprising the steps of:
    placing several fragments of ornamental material of differing natures or colors with faces thereof corresponding to different areas of an inner and visible side of the panel against a wall of a die;
    projecting at least one layer of compact polyurethane onto those portions of the wall of the die which are not covered by said fragments and onto at least one portion of each of said fragments which will face towards an invisible side of the panel in order to connect said fragments, said layer of compact polyurethane being provided through successive projections;
    concealing at least one portion of the die wall before one said projection of compact polyurethane layer; and
    applying a wall forming a lining backing to said compact polyurethane layer, whereby said wall is directly bound to said layer of compact polyurethane, said layer having an ornamental purpose and connecting said fragments.

2. A method according to claim 1, which further comprises the step of
    injecting a certain amount of liquid polyurethane onto said layer of compact polyurethane before said wall or backing is applied.

3. The method of claim 1, wherein at least a portion of the fragments of ornamental material is also concealed before each said projection of compact polyurethane layer.

4. The method of claim 1, wherein said fragments comprise moquette and fabric fragments.

* * * * *